3,097,151
FUELS FOR NUCLEAR REACTORS
Samuel W. Martin, Oak Park, Ill., assignor to Great Lakes Carbon Corporation, New York, N.Y., a corporation of Delaware
No Drawing. Filed Sept. 30, 1957, Ser. No. 686,875
4 Claims. (Cl. 204—154.2)

This invention relates to the production of graphite bodies containing fissionable materials which are suitable for use as neutronic reactor fuels. More particularly, this invention relates to graphite bodies having a fissionable material such as $U^{235}$, plutonium, and mixtures of potentially fissionable compositions uniformly dispersed in the graphite and to processes for making these bodies.

Nuclear reactor fuels have been made by incorporating uranium nitrate solutions within the available pore matrix of a reactor grade synthetic graphite article. This method suffers from the irregularities of pore size and pore size distribution within a synthetic graphite body with resulting local concentrations of uranium which are known to be undesirable.

It is a primary object of this invention to obtain the greatest possible uniformity of dispersion of fissionable material in reactor grade graphite articles.

It is a further object of this invention to produce a novel type of reactor fuel by incorporating uranium in the form of the oxide, or other fissionable material and mixtures of potentially fissionable compositions into a calcined petroleum coke or a binder pitch which is originally made sufficiently pure for reactor purposes or into mixtures of other purified calcined carbonaceous material and binder pitches.

It is a further object of this invention to produce improved uranium-graphite reactor fuels which are adaptable to either fixed pile type of reactors or semi-continuous as well as continuous reactors in which heat is removed by an inert gas or a liquid, and spent reactor fuel is replaced continuously or semi-continuously.

It is a further object to produce an efficient neutronic reactor in which the reaction can be more easily controlled and will continue for a longer time than in previous reactors.

It is also an object of this invention to produce a pile structure of improved dimensional stability.

It is a further object to eliminate the difficulties of recovering the uranium material after use in conventional reactors.

In a broad embodiment, a fissionable material, for example, enriched uranium in the form of the oxide, carbide, etc., is uniformly dispersed or distributed through certain raw carbonaceous materials used in the manufacture of reactor grade graphite. The amount of fissionable material employed may be varied from a few tenths to thirty percent of the final graphite or carbon matrix.

This broad objective may be achieved by a number of novel processes. For example, purified carbon aggregate particles or flour, or purified graphite aggregate particles or flour are impregnated with a uranium solution, followed by evaporation leaving the uranium compounds dispersed in the particles or flour. This material is used with a binder such as tar or pitch which is free of impurities harmful or detrimental to reactor processes, and which may or may not contain uranium or other fissionable compounds. This mix is then processed to a suitable graphite matrix by mix-mulling, followed by forming, baking, and graphitizing the resulting composition.

In a further embodiment of the invention, carbon particles are also made from raw materials (coking stocks) which have been sufficiently purified for reactor usage and in which uranium compounds or other fissionable materials have been colloidally dispersed. The coke products may be calcined and bonded with or without binders in which uranium compounds have been dispersed.

In one specific embodiment the invention comprises impregnating purified calcined coke flour or purified graphite flour (50–60% —200 Tyler mesh) with a uranium solution such as uranium nitrate and evaporating the solution leaving a residue of a uranium compound dispersed throughout the particles of the flour. This flour is then utilized to make a solid body of graphite or pellets of graphite of any desired size and shape. For example, one procedure involves mix-mulling the impregnated flour with a binder such as coal tar pitch which, upon heating, yields a binder coke in amounts to form an article of sufficient strength to be used in reactor applications. Baking of the binder may be performed in either batch furnaces or continuously depending on the size and shape of the fabricated article. Further heating is performed either batchwise or continuously to a sufficiently high temperature to graphitize the carbon matrix and reduce the hydrogen content to desired levels in order to improve the thermal conductivity and other properties of the final product.

Binder materials may be conventional coal tar pitches which have been properly purified. Alternately, resinous binders such as thermosetting phenol-formaldehyde, phenolbenzaldehyde, furfural, and epoxy resins may be employed. Baking may be performed in either batch furnaces or continuously depending on the size and shape of the fabricated article. Further heating is performed either batchwise or continuously to a sufficiently high temperature to graphitize the carbon matrix.

Another embodiment of the invention comprises preparing purified coking stocks in which uranium compounds are colloidally dispersed. Such stocks are illustrated by certain heavy distillate fractions from coal tar distillation. A typical product is so-called Resin "C," which is a semi-solid, coal-tar vacuum distillate having a softening point range of 63–68° C., a specific gravity (15.5° C.) of 1.20 to 1.28 and a quinoline-insoluble content of less than 0.3 (as determined by Barrett B–21 procedure). Alternately, a purified gas oil or similar material may be thermall cracked to obtain a heavy residue in which the uranium compound is colloidally dispersed prior to coking by a variety of methods, i.e. delayed coking, broad oven coking, slot oven coking, fluid coking, and flash carbonization. This coke product is calcined and then utilized as an aggregate and processed further in accordance with the above illustrated procedures.

I have found that conventional mixers such as the sigma or paddle mixer which are normally employed in making carbon and graphite bodies including electrodes do not produce a uniform dispersion of the fissionable material in the graphite as indicated by X-ray studies. I have found that the use of the so-called mix-muller does produce a uniform dispersion of the fissionable material in the finished graphite which is useful as neutronic reactor fuels. This type of mixer has one or more large wheels or mullers rolling around in a pan together with scraper blades or plows and combines a kneading, grinding, and mixing action, giving thereby very intimate mixtures. The speeds of rotation is usually slow so that the power required is not excessive. The rollers are usually steel, though sometimes stone. Since the mullers have a wide face, there is constant twisting or shear on the line of contact between the muller face and the material next to the bottom of the pan. The scrapers or knives, rotating with the rollers around the central axis, deflect the material into the path of the rollers and also scrape the sides and bottom of the pan.

The novel process disclosed herein is illustrated by the following examples.

While uranium is the preferred fissionable material, this invention is not intended to be limited to uranium, but is also applicable to plutonium compounds and other elements or compounds which may be suitable as fuels in reactor applications Also, mixtures of uranium and thorium and their compounds which can be made fissionable in a breeder reactor are usable and are contemplated by my invention.

By using the processes outlined above, it is possible to produce economically and efficiently a highly uniform distribution of uranium throughout the final graphite structure or fuel element which can be utilized batchwise in a reactor or designed to make possible a reactor in which the uranium-impregnated graphite may circulate continuously within the reactor to the fuel processing section of the plant.

This novel process also permits the production of uranium-containing graphite articles of varying degrees of hardness depending on the shape specified. Also controllable is the ratio of graphite to uranium as well as the graphite apparent density.

The uranium-graphite reactor fuels described in this invention can be used in a neutronic reactor such as is described in U.S. Patent 2,708,656 to Enrico Fermi and Leo Szilard. Solid uranium-graphite blocks made in accordance with my invention, replace the graphite blocks containing uranium metal cylinders as described in the Fermi et al. patent. The basic construction unit used to fill the vault space is a graphite block 4⅛" by 4⅛" in cross section. The blocks are piled or stacked to fill the vault space without substantial air spaces. Uranium-graphite blocks in conjunction with dead graphite blocks containing no fissionable material are used to build up the chain reacting system in the vault space by assembling the blocks into a uranium lump lattice arrangement to provide an active portion of substantially cubicle form, surrounded by several layers of dead or inactive graphite to act as a reflector. Three bottom layers of dead graphite are laid down on the foundation 22' deep and 20' wide to start a reflector. The blocks are closely piled to minimize air space. The uranium-bearing layers are started so that each live graphite row is spaced by a row of dead graphite, with the uranium bodies aligned both across and in depth in the vault space. The uranium-bearing rows do not begin until 12" of dead graphite is laid down next to the concrete walls of the vault and at the open front, and three sides have 16" of dead graphite. Thus the foundation of an active portion having a substantially square base is set up, with the base surrounded on all sides with at least 12" of graphite, with the uranium-bearing portion of the layer being about 17½' wide by 19½' deep. The reactor is built up, layer by layer, over alternate graphite and uranium-graphite layers.

The uranium-graphite fuel elements described in this invention may be shaped into spheres or pellets and used in a neutronic reactor such as is described in British Patent 756,014 to Westinghouse Electric International Co. This nuclear reactor comprises a reactor vessel containing a core container having a perforate bottom wall adapted to support a bed of solid freely movable pellets at least some of which include fissionable material, means for directing a flow of fluid upwardly through the bottom wall of the container, a fluid outlet in the upper portion of the container, and means for supplying fluid to the flow directing means in an amount and at a pressure sufficient to force the pellets upwardly into such position within the container so that a chain reaction is set up and maintained.

By using the uranium-graphite fuels as described in my invention, it is possible to produce a more efficient neutronic reactor since the reaction can be more easily controlled and will continue for a longer time than in previous reactors. Also, the pile structure has improved dimensional stability. The difficulties of recovering the uranium material after use in conventional reactors are also eliminated by the use of the uranium-graphite fuel as described in this invention because the blocks can simply be burned to recover the active materials in concentrated form.

This invention is a continuation in part of application Serial Number 616,608, filed October 18, 1956, now abandoned.

Having thus described and exemplified my invention but intending to be limited only by the scope of the appended claims, I claim:

1. A process for producing a graphite body in which a fissionable material is uniformly dispersed in the graphite which comprises colloidally dispersing a fissionable compound in a purified coking stock, coking said stock, calcining the resulting coke composition, mixing the resulting calcined coke composition with a binder, and mix-mulling the resulting mixture, and molding, baking, and graphitizing the resultant product.

2. A process for producing a graphite body in which a fissionable material is uniformly dispersed in the graphite which comprises impregnating purified calcined coke flour with a solution of a fissionable material, evaporating the solution leaving a residue of a fissionable material dispersed throughout the particles of the flour, mix-mulling a mixture of the impregnated flour and a binder, and molding, baking, and graphitizing the resultant product.

3. A process for producing a graphitic body in which a fissionable material is uniformly dispersed in the graphite which comprises impregnating purified graphite flour with a solution of a fissionable material, evaporating the solution leaving a residue of the fissionable material dispersed throughout the particles of the flour, mix-mulling a mixture of the impregnated flour and a binder, and molding and baking.

4. The process of claim 3 wherein the solution of the fissionable material is uranium nitrate containing enriched uranium.

References Cited in the file of this patent

UNITED STATES PATENTS

| | | |
|---|---|---|
| 2,315,346 | Mitchell | Mar. 30, 1943 |
| 2,563,285 | Shea et al. | Aug. 7, 1951 |

OTHER REFERENCES

AEC document, AECD-4095, April 1950, in particular pages 5-7.

TID-10001, October 13, 1954. Available from Technical Information Service, Industrial Reports Section, P.O. Box 1001, Oak Ridge, Tenn.

Howe: Vol. 9, International Conf. on Peaceful Uses of Atomic Energy, page 184, 1955.

Nuclear Fuels, edited by Gurinsky, Van Nostrand Co., Inc., New York. Page 227, 1956.